United States Patent [19]
Waggener

[11] 3,984,624
[45] Oct. 5, 1976

[54] VIDEO SYSTEM FOR CONVEYING DIGITAL AND ANALOG INFORMATION

[75] Inventor: William N. Waggener, Sarasota, Fla.

[73] Assignee: Weston Instruments, Inc., Newark, N.J.

[22] Filed: July 25, 1974

[21] Appl. No.: 491,628

[52] U.S. Cl.......................... 178/5.6; 178/DIG. 23; 178/5.8 R
[51] Int. Cl.².......................................... H04N 7/08
[58] Field of Search........... 178/5.6, DIG. 23, 5.8 R; 179/15 BY, 15 BW, 15 BM

[56] References Cited
UNITED STATES PATENTS

| | | | |
|---|---|---|---|
| 2,624,797 | 1/1953 | Lawson et al. | 178/5.6 |
| 3,752,907 | 8/1973 | Mazza | 178/5.6 |
| 3,838,444 | 9/1974 | Loughlin et al. | 179/15 BM |
| 3,842,196 | 10/1974 | Loughlin | 179/15 BM |
| 3,870,828 | 3/1975 | Saliga | 179/15 BY |

Primary Examiner—John C. Martin
Attorney, Agent, or Firm—William R. Sherman; Kevin McMahon; I. Kavrukov

[57] ABSTRACT

A video system having a transmitter in which a composite signal is formed by combining digital information with scanlines of an analog video signal generated by a line scanning device, and a receiver in which the digital information is recovered. The digital information is combined with the analog video signal at predetermined locations along scanlines of the video signal, and these predetermined locations are varied in order to prevent visible deterioration of the video image. In the video receiver, the digital information is recovered by examining the composite signal at the predetermined locations to extract the digital information. Each bit of digital information to be conveyed is represented by a first pseudo-random digital pulse sequence (or its complement, depending on whether the data bit is 1 or 0) which is superimposed on a selected scanline of the analog video signal to form the composite signal. The digital information is recovered at the receiver by generating a second pseudo-random digital pulse sequence in synchronism with the first sequence, and by examining the composite signal at locations determined by the second digital pulse sequence to extract the digital information contained in the composite signal.

51 Claims, 5 Drawing Figures

Fig. 3. RECEIVER

VIDEO SYSTEM FOR CONVEYING DIGITAL AND ANALOG INFORMATION

BACKGROUND OF THE INVENTION

The invention relates to video systems, and relates specifically to systems for forming a composite signal by combining digital information with an analog video signal and for recovering the digital information from the composite signal.

A number of systems exist for transmitting information in conjunction with an analog video signal. In order to avoid flicker or spotting at the TV receiver, a number of these prior art systems modulate portions of the transmitted signal which are outside the visible scanlines. Typically, systems of this type modulate scanline sync pulses, transmit control information during the vertical blanking interval of a frame field, transmit control information between video cuts, or utilize a separate frequency band for transmitting additional information. Systems of this type are disclosed in U.S. Pat. Nos. 3,752,907; 3,493,674; 3,730,986; and 3,145,262. Since these systems transmit information outside the visible scanlines of a video signal, they are capable of utilizing only a small portion of the total video transmission time for conveying additional information, and are therefore likely to have a slower rate of transmission and possibly a higher occurrence of errors than a system capable of transmitting information concurrently with the visible portion of the video signal.

One system for superimposing digital information on the visible portion of an analog video signal is shown in U.S. Pat. No. 3,061,669 to Leek. In Leek, the output of a first TV camera is converted to a pulse-amplitude-modulated train of narrow, high-amplitude pulses which are then superimposed on the visible scanlines of a second TV camera output. At the receiver these narrow pulses are removed from the analog video information and are converted back to an analog video signal by amplitude demodulation and pulse stretching. While the Leek disclosure is very sketchy and does not discuss this question, it would appear that the Leek system would require additional bandwidth for transmission of the composite signal. Additionally, since there is nothing to prevent the occurrence of the same pattern of narrow pulses on successive scanlines or frames of the analog video signal, it would appear that visible flicker and spotting on the video receiver could not be prevented. A similar technique applied to an audio signal is shown in Tomsa, U.S. Pat. No. 3,735,048. In Tomsa, an audio signal is interrupted by short pulses conveying additional information. Since these pulses can occur at any time, this system is not suitable for use in video applications where visible flicker and spotting may result, and the pulses may even interfere with the horizontal and vertical sync signals.

Other known techniques for transmitting additional information in conjunction with a video signal include inversion of selected scanlines, and transmission of information in a narrow portion of at least one scanline per frame, as shown in U.S. Pat. Nos. 3,069,492 and 3,746,780, respectively. A technique for introducing additional digital data into a digitized signal stream is shown in U.S. Pat. No. 3,727,005.

The prior art discussed above indicates that numerous systems have been developed to transmit information on portions of a video signal that are outside the visible scanlines. When digital information is applied to the visible portion of video scanlines, as in Leek, no provisions are made to prevent the occurrence of repetitive pulse patterns on successive scanlines, which are likely to cause visible flicker and spotting on the received image. Furthermore, in the prior art discussed above no provision is made for maintaining the fidelity of the video image while concurrently minimizing the bandwidth of the composite signal.

SUMMARY OF THE INVENTION

The invention is in the field of video signals, and relates specifically to systems for forming a composite signal by combining digital information with an analog video signal and for recovering the digital information from the composite signal.

An object of the invention is to provide a system and method for digital data transmission and recovery suitable for use in conjunction with scanlines of an analog video signal. A further object of the invention is to provide a system and method for transmitting digital information on a video signal without increasing the bandwidth of the video signal. Still another object of the invention is to provide a system and method for transmitting and recovering digital information in conjunction with an analog video signal while preventing flicker and spotting of the transmitted video image.

To these and other ends the present invention combines digital information with the analog video signal at predetermined locations along the analog video scanlines. These predetermined locations are varied between scanlines to prevent visible deterioration of the video image. The digital information is then recovered by examining the composite signal at the predetermined locations to extract the digital information from the composite signal.

Specifically, a video transmitter embodying the invention receives a line-by-line analog video signal, a frame sync signal and a scanline sync signal from an imaging device such as a television camera. The video transmitter also receives the digital information to be combined with the analog signal. When a frame sync signal is received by the video transmitter, the system is reset to an initial condition. Subsequently, scanline sync pulses are counted, and a pseudo-random digital pulse sequence is generated synchronously with each scanline. The pulse distribution of this pseudo-random digital pulse sequence is a predetermined function of the scanline count so that pulse sequences corresponding to adjacent or nearby scanlines are not repetitive. Each scanline is thus associated with a corresponding pseudo-random digital pulse sequence which is a function of the scanline count.

For each scanline, one bit of digital information is selected for transmission, and the information content of this bit controls the phase of the pseudo-random digital sequence corresponding to that scanline. The pseudo-random digital pulse sequence of selected phase is then superimposed upon the analog video signal to create a composite signal containing both analog video information and digital information.

This composite signal is transmitted to a video receiver embodying the invention, along with frame sync and scanline sync control signals. In the video receiver a second set of pseudo-random digital pulse sequences is generated. These second sequences are in pulse-location synchronism with the corresponding first pseudo-random digital pulse sequences, because they are also generated as a function of the scanline count. The second sequences are utilized to coherently detect the corresponding first sequences superimposed upon the video signal at the transmitter. This is done by multiplying each line of the composite signal by its corresponding second sequence. This multiplication produces a product signal which is a function of the phase of the first pseudo-random digital pulse sequence. The product signal is then integrated for the duration of its associated scanline, and the integrated signal is compared to the average level of the composite signal. From this comparison the phase of the pseudo-random digital pulse sequence superimposed upon each scanline of the analog video signal at the transmitter is determined. Finally, the content of each transmitted bit of digital information is established from each corresponding phase determination, so that the original digital information can be reproduced at the receiver.

In the system described above, the digital information is not removed from the composite signal. For most applications this is entirely adequate, because the viewer is generally not aware of any visible deterioration in the video image due to the digital information added in accordance with the invention. In some applications, however, it may be desirable to remove this digital information for absolute fidelity of the image. In accordance with another aspect of the invention, this is done by generating an inverted replica of the pseudo-random pulse sequence contained on each line of the composite signal, and subtracting this inverted replica from the composite signal to reproduce the original analog video signal. Since a replica of the pulse sequence contained on a given line can not be generated until the phase of that pulse sequence is determined after examining the entire scanline, the resulting analog video signal must be generated with a one-scanline delay from the composite signal. By using a charge coupled device serving as an analog delay line synchronized to the receiver to obtain the desired delay, any time-base variations occurring in the receiver are automatically removed.

DETAILED DESCRIPTION

Figure 1:
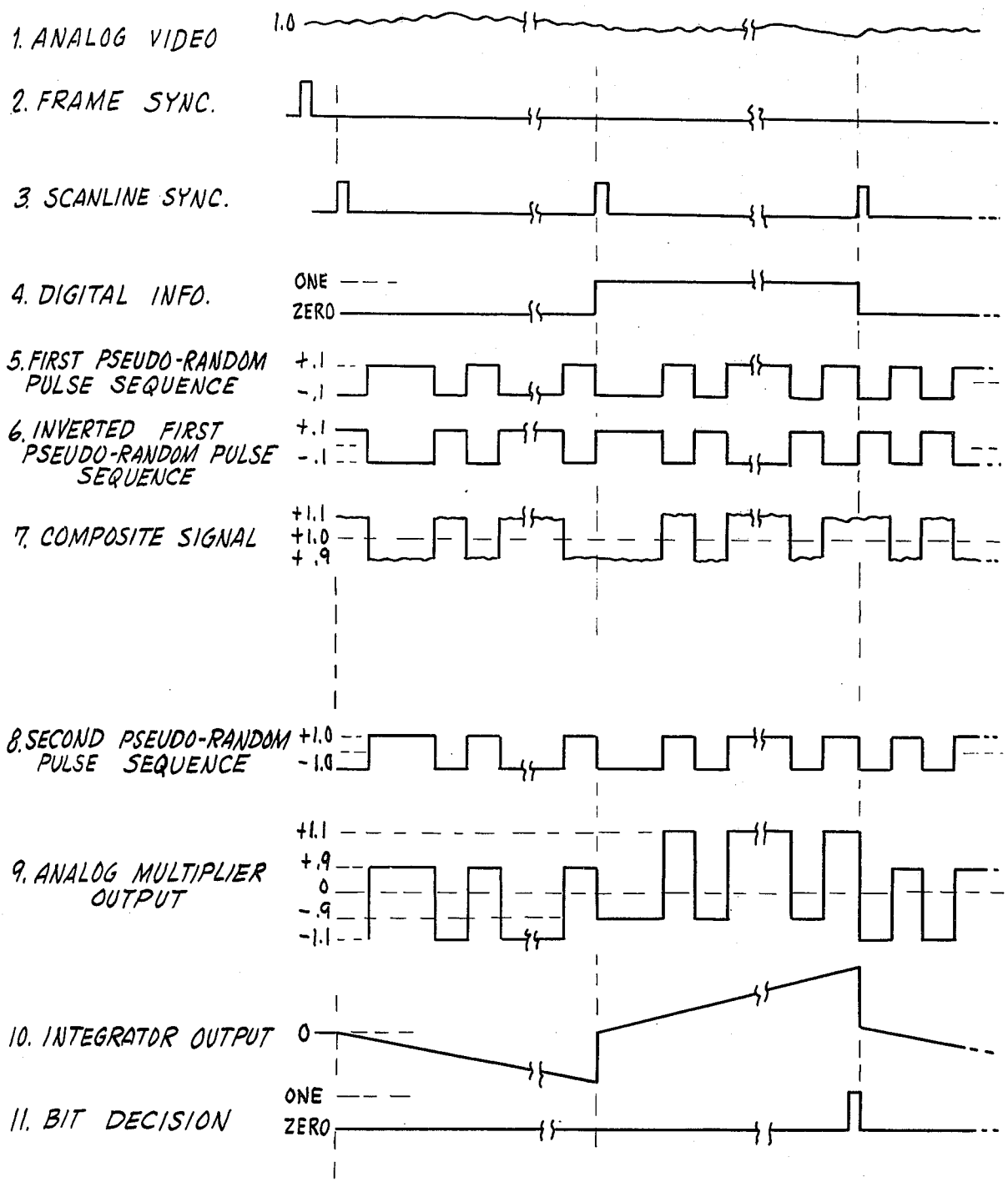
FIG. 1 is a simplified timing diagram of waveforms associated with the disclosed invention.

Referring to the illustrative simplified timing diagram of FIG. 1 for a general explanation of the principles involved in this invention, a video transmitter embodying the invention receives an analog video signal, a frame sync signal, and a scanline sync signal from a conventional imaging device such as a television camera, typically as shown in lines 1, 2, and 3 respectively. The digital information to be transmitted is provided to the video transmitter at the rate of one bit per scanline, as shown in line 4. Note that FIG. 1 illustrates, in simplified form, representative rather than actual waveforms.

In the transmitter a representation of this digital information is combined with the analog video signal of line 1 in a manner which prevents visible degradation of the video image formed by the analog video signal. This includes generating a pseudo-random representation of the digital information and combining it with the analog video signal.

To do this, a first pseudo-random pulse sequence and its complement are generated, as shown in lines 5 and 6. A different pulse sequence is generated for each scanline of the analog video signal so as to avoid a repetitive modulation pattern on the video image, since repetitive patterns tend to produce visible degradation of the image, such as flicker, spotting, streaks and the like. A composite signal as shown in line 7 is generated by combining each scanline of the analog video signal with either the first pseudo-random pulse sequence or its complement. The selection of the desired pulse sequence for a given scanline is controlled by the level of the bit of digital information to be transmitted during that particular scanline. A logical one bit causes the first pseudo-random pulse to be selected, and a logical zero bit causes the inverted sequence (complement) to be selected. This process results in a composite signal as shown in line 7, in which the inverted pulse sequence is combined with the analog video signal during the scanline from T1 to T2, corresponding to a logical zero bit of digital information, and in which the non-inverted pulse sequence is combined with the analog video signal during the scanline from T2 to T3, when a logical one bit of digital information is to be transmitted. Similarly, for each succeeding scanline either the pulse sequence of line 5 or the inverted pulse sequence of line 6 is combined with the analog video signal depending upon whether a logical one or logical zero bit of digital information is to be transmitted.

The transmitted digital information is recovered from the composite signal by generating a second pseudo-random pulse sequence in pulse-location synchronism with the first pulse sequence of line 5, as shown in line 8. This second pulse sequence is then multiplied with the composite signal to produce an analog multiplier output as shown in line 9. For the illustrative signal levels shown in FIG. 1, namely, an analog video signal level of approximately +1.0 volt and pseudo-random pulse sequences going from −0.1 volt to +0.1 volt, a composite signal varying from approximately +0.9 volt to approximately +1.1 volts is produced.

For these illustrative signal levels, the second pseudo-random pulse sequence shown in line 8 goes from +1.0 volt to −1.0 volt, and is multiplied with the composite signal to produce the analog multiplier output of line 9. If the inverted first pseudo-random pulse sequence is combined with the analog video signal, as occurs during the interval from T1 to T2, the analog multiplier output varies from −1.1 volts to +0.9 volt. Since it is a property of pseudo-random pulse sequences that the number of ones is approximately equal to the number of zeros, the average level of the analog multiplier output during this interval from T1 to T2 is negative. Conversely, for the scanline from T2 to T3, the first pseudo-random pulse sequence was combined with the analog video signal to convey a logical one bit of digital information; for this scanline, the analog multiplier output varies from −0.9 volt to +1.1 volts, resulting in an average positive level. Similarly, subsequent intervals (each representing the period of one scanline) exhibit either a positive or negative average analog multiplier output level depending upon the level of the bit of digital information conveyed by the composite signal during that scanline interval.

The analog multiplier output of line 9 is then integrated over each scanline interval in produce either a negative-going ramp for a negative average level, as shown from T1 to T2, or a positive-going ramp for a positive average level, as shown from T2 to T3. A negative-going integrator output results in "zero" bit decision at the end of the corresponding scanline interval, as shown at T2 in line 11, while a positive-going integrator output results in a "one" bit decision, as at T3. Each bit decision is thus the result of a high-redundancy pulse sequence integration over the duration of a full scanline, and the possibility of an erroneous bit decision resulting from an error in one or even a number of pulses is minimized. Furthermore, this high redundancy technique permits the digital information on the composite signal to be of substantially smaller amplitude than the analog video signal, to thus minimize interference with the transmitted video image. Interference is further reduced by the pseudo-random nature of the pulse sequences used to convey the digital information. This technique precludes the appearance of repetitive pulse trains on the composite signal and prevents visible flicker, streaks and spotting on the video image. Additionally, since each sequence has an approximately equal number of ones and zeros, the average level of the analog video signal is not appreciably changed.

Figure 2:
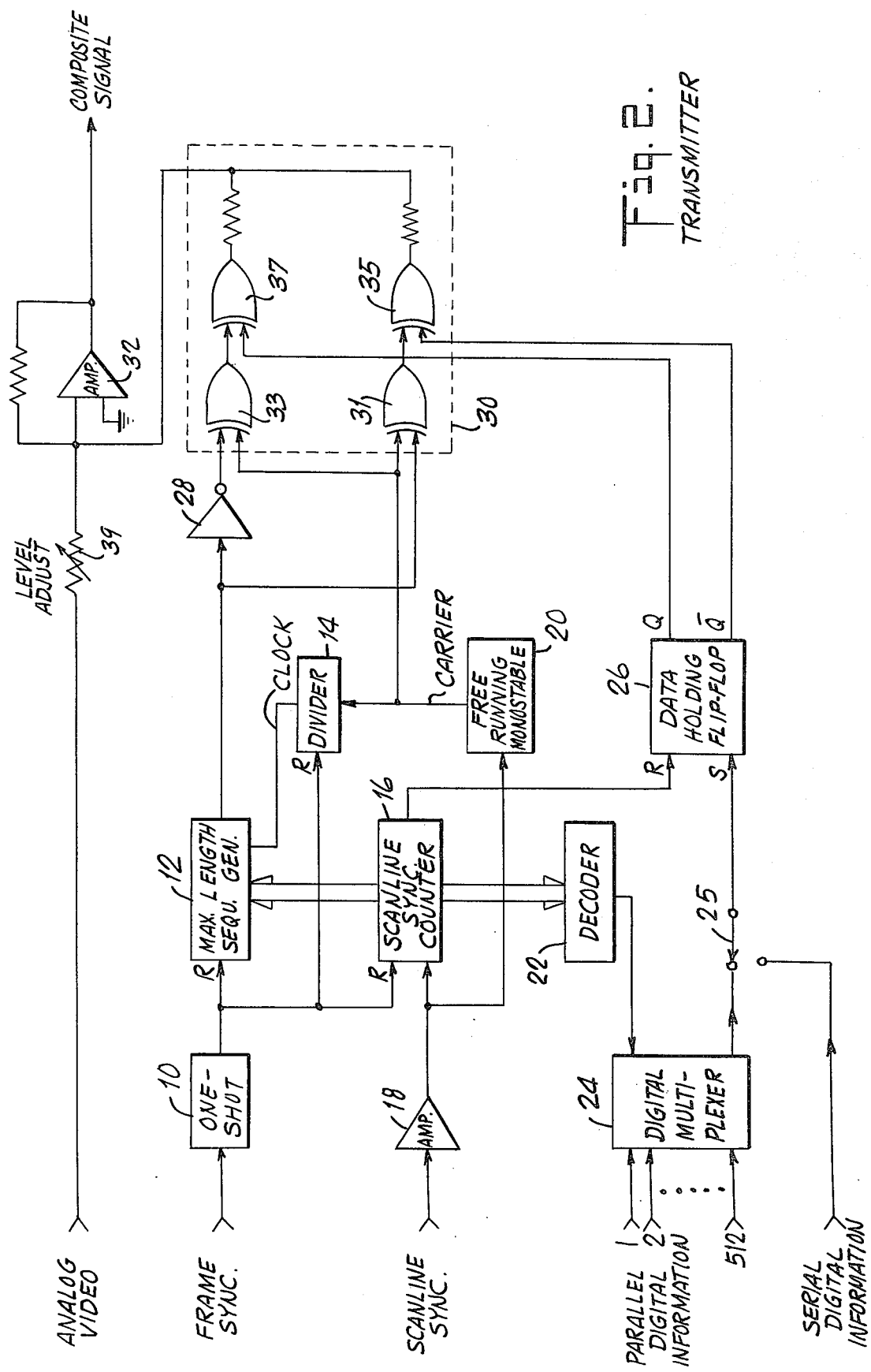
FIG. 2 is a block diagram of a portion of a video transmitter embodying the invention.

Referring to FIG. 2, a video transmitter embodying the invention receives an analog video signal, a frame sync signal and a scanline sync signal as shown in FIG. 1, lines 1, 2 and 3, from a conventional imaging device such as a television camera (not shown) and one bit of digital information for each scanline, as shown in line 4. For each scanline a composite signal is generated which comprises the analog video signal and a superimposed pseudo-random sequence whose phase corresponds to a one or to a zero digital information bit, as shown in line 7. The system is initiated by a frame sync signal which triggers a one-shot 10 and thereby resets a maximum length sequence generator 12, a divider 14 and a scanline sync counter 16.

Following the frame sync pulse, each of the scanline sync pulses occurring during that frame is fed through an amplifier 18 to scanline sync counter 16 and free-running monostable 20. The scanline count generated by scanline sync counter 16 goes to maximum length sequence generator 12 and a decoder 22. Maximum length sequence generator 12 is of conventional design, utilizing a shift register in conjunction with feedback logic to generate a pseudo-random maximum length sequence pulse train. When clock pulses are applied to a sequence generator of this type the waveform of the pulse sequence at its output is a function of its internal feedback logic configuration (which is fixed) and of the initial condition which is applied to the generator. Sequence generators of this type are disclosed in Golomb, et al., Digital Communications With Space Applications, Prentice-Hall, Inc. 1964. The initial condition on maximum length sequence generator 12 is provided by scanline sync counter 16, to cause a different pulse sequence to be generated for each scanline of the video frame, in response to a clock pulse train received from divider 14. The pulse output rate of sequence generator 12 is determined by the rate of the clock pulses applied from divider 14. Free-running monostable 20 is synchronized with the scanline sync pulses by a signal from amplifier 18 and generates a carrier frequency signal which is applied to divider 14. The clock signal applied to sequence generator 12 is thus derived from the carrier frequency. Divider 14 is selected to provide an even-integer division ratio so that there will always be an even number of carrier pulses from each clock pulse. Typically, a division ratio of 4 may be selected, in which case the clock rate to sequence generator 12 is one quarter of the carrier frequency, resulting in a pseudo-random pulse sequence output rate of one quarter of the carrier frequency. The carrier frequency is typically about 512 times the line sync pulse rate.

The portions of the video transmitter thus far described have the function of generating a carrier signal synchronized to the scanline sync pulses, and of generating a different pseudo-random pulse sequence for each scanline of a video frame, with the pulse rate of this pseudo-random pulse sequence being a submultiple of the carrier frequency.

Digital information is provided to the video transmitter from suitable prior art services (not shown) at the rate of one bit per scanline, as shown in line 4 of FIG. 1. This digital information may be accepted in either serial or parallel form, as selected by a switch 25. When digital information is provided in serial form the information is conveyed directly to the SET input of a data holding flip-flop 26 by switch 25. When digital information is provided in parallel form, the information is fed to a digital multiplexer 24. Decoder 22 selects the appropriate bit of digital information for the corresponding scanline sync count and causes multiplexer 24 to convey this information to the SET input of flip-flop 26 through switch 25. Data holding flip-flop 26 is reset at the start of each scanline by an output from scanline sync counter 16. If the bit of digital information to be conveyed on a given scanline is a digital zero, no input appears on the SET line of flip-flop 26 for that scanline after the flip-flop has been reset, and its Q output remains low. Conversely, if a digital one is to be conveyed, a signal is received on the SET line of flip-flop 26 through switch 25, and this causes the Q output of flip-flop 26 to go high.

The outputs of data holding flip-flop 26, along with the carrier signal from monostable 20 and the pseudo-random pulse sequence from generator 12, are applied to an exclusive-OR network 30, along with the complement of the pseudo-random pulse sequence provided by an inverter 28. The two pulse sequences, labeled first and inverted first pseudo-random pulse sequence at lines 5 and 6 respectively of FIG. 1 are the outputs of an exclusive-OR gate 31 and an exclusive-OR gate 33 respectively. These outputs represent the carrier signal from free-running monostable 20 modulated by the pseudo-random pulse sequence output of sequence generator 12 (in gate 31) and by the inverted pseudo-random pulse sequence output of inverter 28 (in gate 33). These outputs are then combined with the Q and $\overline{Q}$ outputs of data holding flip-flop 26 in an exclusive-OR gate 37 and an exclusive-OR gate 35 respectively. The combined output of exclusive-OR gates 35 and 37 comprises a pseudo-random pulse sequence with a waveform corresponding to the first pseudo-random pulse sequence when data holding flip-flop 26 is set and corresponding to the output of the inverted first pseudo-random pulse sequence when data holding flip-flop 26 is reset. The output from exclusive-OR network 30 is therefore a pseudo-random pulse sequence which is phase modulated as a function of the information stored in data holding flip-flop 26. Since this information corresponds to the bit of digital information to be transmitted, the phase of the pseudo-random pulse sequence output of network 30 conveys the digital information to be transmitted.

The output from network 30 is combined with the analog video signal in an amplifier 32. A level adjust control 39 is provided to vary the amplitude of the analog video signal applied to amplifier 32. This control is typically set so that the pseudo-random signal is a small fraction (typically 5 to 10 percent) of the peak-to-peak video signal level. Amplifier 32 thus generates a composite signal consisting of an analog video signal combined with a phase modulated pseudo-random pulse sequence of relatively small amplitude, as shown in line 7 of FIG. 1. This phase modulated composite signal conveys the desired digital information.

Figure 3:
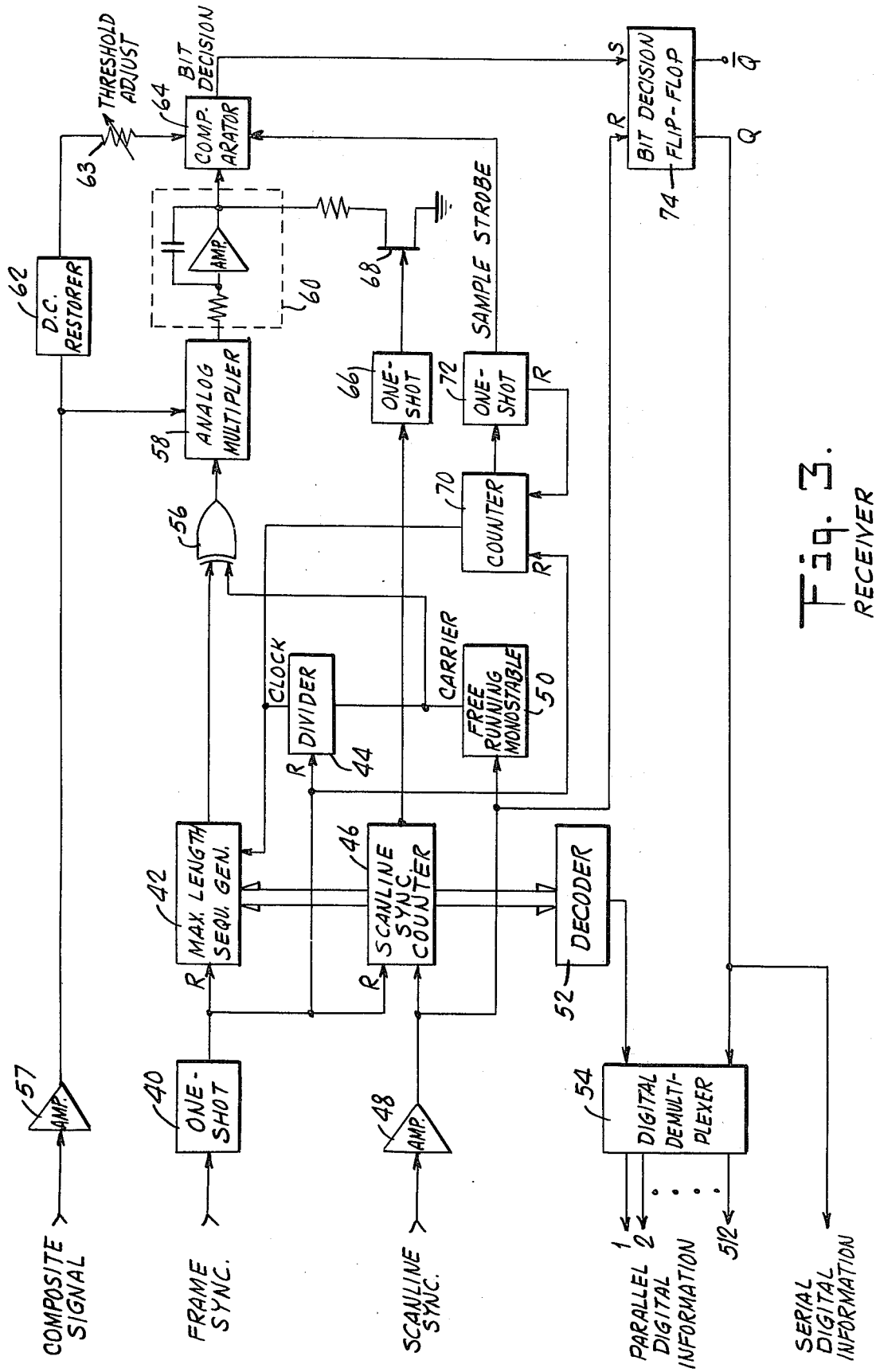
FIG. 3 is a block diagram of a portion of a video receiver embodying the invention.

Referring now to FIG. 3, a video receiver embodying the invention receives the composite signal from the video transmitter, as well as frame and scanline sync pulses, such as the illustrative signals of FIG. 1, lines 2, 3, and 7. The video receiver uses the frame sync and scanline sync pulses to generate a second pseudo-random pulse sequence, and this second sequence is used to recover the transmitted digital information from the composite signal. The frame sync and scanline sync pulses are processed by circuitry identical to that of the video transmitter of FIG. 2 to generate a duplicate carrier signal synchronized to the scanline sync pulses at the output of a free-running monostable 50, and a duplicate pseudo-random pulse sequence for each corresponding scanline of a video frame at the output of a maximum length sequence generator 42. The circuits numbered 10 to 22 in FIG. 2 correspond in sequential order to the circuits numbered 40 to 52 in FIG. 3. As in the transmitter, the pulse rate of these pseudo-random pulse sequences is a submultiple of the carrier frequency. The carrier signal from monostable 50 and the pseudo-random pulse sequence from a generator 42 are combined in an exclusive-OR gate 56 to generate a second pseudo-random pulse sequence such as the one shown in line 8 of FIG. 1. This second pulse sequence is in synchronism with the corresponding first pseudo-random pulse sequence of line 5.

The typical composite signal shown in line 7 of FIG. 1 is amplified by an amplifier 57 and is then multiplied with the second pseudo-random sequence in line 8 in an analog multiplier 58 to produce an analog multiplier output of the type shown in line 9 of FIG. 1. As discussed above, this multiplication generates a signal with a negative average level when the first pseudo-random pulse sequence is combined with the analog video at the transmitter, and produces a positive average level when the inverted first sequence is so combined. With reference to FIG. 1, during the one-scanline time interval from T1 to T2 a digital zero bit of information is transmitted on the composite signal by combining the inverted pulse sequence with the analog video signal. Thus, during this time interval the digital information on the composite signal of line 7 is out of phase with the second pseudo-random pulse sequence of line 8, resulting in the typical analog multiplier output waveform of line 9, which has an average negative level. Conversely, during the one-scanline time period from T2 to T3, a digital one bit of information is transmitted and the digital information on the composite signal of line 7 is in phase with the second pseudo-random pulse sequence of line 8. This results in an analog multiplier output with a positive average level, as shown on line 9 from T2 to T3.

The analog multiplier output is integrated over each scanline interval in an integrator 60 to generate an integrator output as shown on line 10. A negative average level from analog multiplier 58 results in a negative-going ramp output from integrator 60 as shown during the one-scanline interval from T1 to T2, while a positive average level from multiplier 58 output results in a positive-going ramp, as for the scanline from T2 to T3. To determine if the average level from multiplier 58 is positive or negative, a reference level proportional to the average video level signal is generated from the composite signal by a DC restorer 62 and a threshold adjust control 63, and is compared with the output of integrator 60 in a comparator 64. When comparator 64 is triggered by an output from a one-shot 72 at the end of a scanline, a bit decision output is generated, as shown in line 11. For a negative-going integrator output, the reference level derived from the composite signal is not exceeded, and the output level of comparator 64 remains low, as shown at T2 on line 11. For a positive-going integrator output, however, the reference level is exceeded and a bit decision output signal occurs, indicating that a digital one bit of information was transmitted, as shown at time T3 on line 11. Integrator 60 is reset at the start of each scanline by a switch 68, shown as a FET switch in FIG. 3. This switch 68 is controlled by a signal from a one-shot 66 which is in turn triggered by the output from a scanline sync counter 46. A counter 70 is reset by one-shot 40 at the start of each frame, and is preset to generate an output after counting aa predetermined number of clock pulses from divider 44. Typically, counter 70 may be set to generate an output when a number of clock pulses corresponding to a full scanline have been generated by divider 44. Thus, at the end of each scanline, counter 70 generates an output and thereby triggers one-shot 72. One-shot 72 resets counter 70 when it is triggered so that counter 70 may begin counting clock pulses from divider 44 for the subsequent scanline. One-shot 72 also provides a sample strobe signal to comparator 64 to generate the bit decision output discussed previously.

The bit decision output from comparator 64, shown on line 11 of FIG. 1, provides a set input to a bit decision flip-flop 74. This flip-flop is reset at the start of each scanline by a signal from amplifier 48, and may then be set by a bit decision pulse from comparator 64 upon the occurrence of a sample strobe signal from one-shot 72. As discussed above, when a digital zero bit of information is transmitted, the bit decision output of comparator 64 remains in the zero state and no output pulse is generated. This condition, shown at T2 on line 11, causes bit decision flip-flop 74 to remain in the reset state, with its Q output low. Conversely, when a digital one bit of information is transmitted, a bit decision pluse is generated on the SET line of flip-flop 74, as shown at T3 on line 11. This set input causes the Q output of flip-flop 74 to go high, corresponding to a digital one bit of information. The output from bit decision flip-flop 74 may be utilized directly to provide a serial digital information output, or the output of flip-flop 74 may be converted to parallel digital information in a digital demultiplexer 54. A decoder 52 decodes the contents of scanline counter 46 to cause digital demultiplexer 54 to generate an output corresponding to the level of flip-flop 74 to appear on the appropriate output line of digital demultiplexer 54 to provide the desired parallel output format. The recovered digital information is directed to suitable prior art recording or control devices (not shown).

In the system previously described, the digital pulse sequence is not removed from the composite signal. For most applications this technique is entirely adequate, as the viewer is generally not aware of any visible deterioration of the image. In some critical applications, however, as where the image must be examined for high frequency detail, it may be desirable to remove this digital information.

Figure 4:
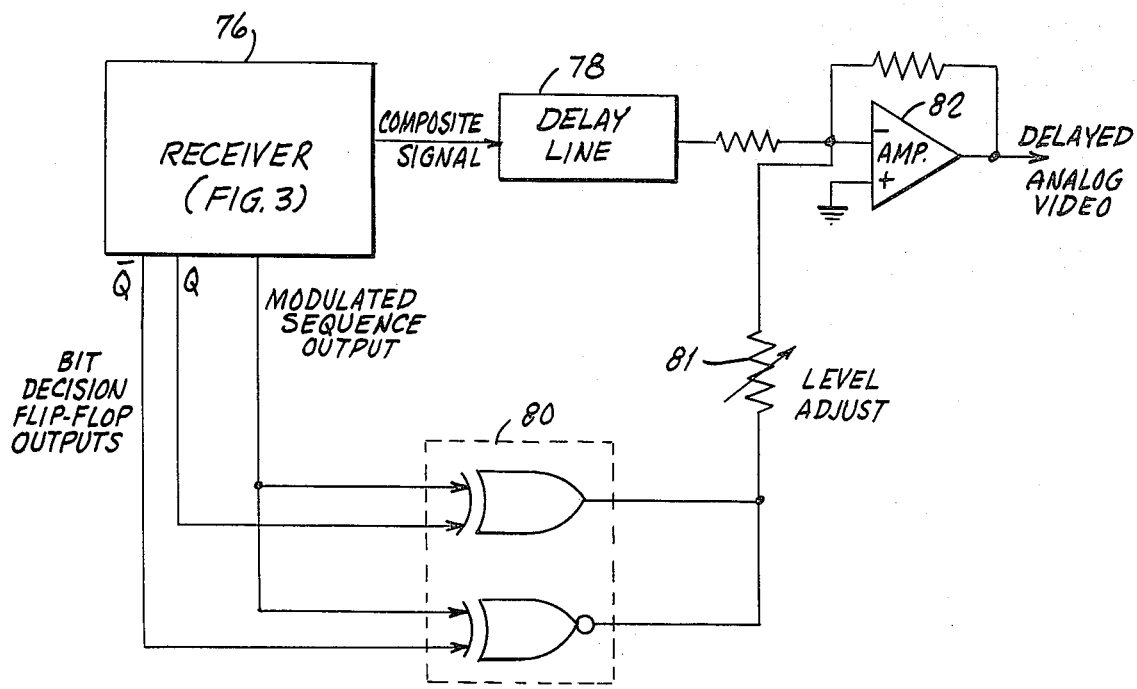
FIG. 4 is a block diagram of an embodiment of the invention incorporating a system for removing digital information from a composite signal to restore the original video signal.

FIG. 4 therefore shows an alternate embodiment of the invention capable of removing the digital pulse sequence from the composite signal. A receiver 76 (of the type shown in FIG. 3) provides bit decision flip-flop outputs Q and $\bar{Q}$ which represent the level of each bit of digital information recovered from the received composite signal, and a modulated sequence output which is a regenerated pseudo-random sequence corresponding to the second sequence (from gate 56 in FIG. 3) associated with the scanline for which a bit decision flip-flop output has been generated. These signals are combined in an exclusive-OR network 80 to generate an inverted replica of the pseudo-random pulse sequence on the composite signal. Since network 80 must await the bit decision output, which occurs at the end of each scanline before the proper sequence can be generated, the regenerated pseudo-random sequence output of network 80 is delayed by one scanline from the pulse sequence contained on the composite signal.

To compensate for this delay, the composite signal obtained from the receiver 76 (at the output of amplifier 57 of FIG. 3) is delayed by one scanline interval at a delay line 78. This delayed composite signal is then fed to the input of an amplifier 82 along with the regenerated pseudo-random sequence output of network 80. The amplitude of the regenerated sequence from network 80 is adjusted by a level adjust control 81 to correspond to the level of the digital information on the delayed composite signal from delay line 78. Accordingly, the digital information contained on the delayed composite signal from delay line 78 is cancelled by the equal but inverted pulse sequence derived from network 80. The output from amplifier 82 thus comprises an analog video signal which is delayed by one scanline from the composite signal and which is substantially free of digital modulation.

Figure 5:
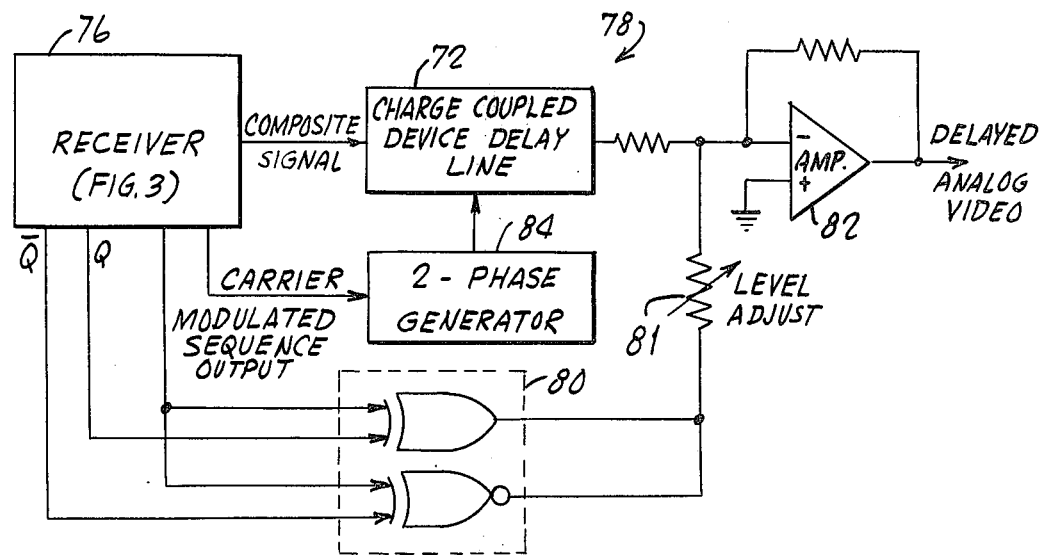
FIG. 5 is an alternate embodiment of the system shown in FIG. 4.

In the alternate embodiment shown in FIG. 5, delay line 78 comprises a charge coupled device (CCD) 72 serving as an analog delay line and a two-phase generator 84. The carrier signal from receiver 76 is used to activate two-phase generator 84, which provides clock signals for CCD 72. CCD 72 serves as a solid state electronic delay circuit which essentially samples the incoming composite signal and transfers the charge associated with each sample down a delay line comprising coupled capacitor storage devices. By driving the CCD delay line with a signal derived from the digital carrier generated in receiver 76 (at the output of monostable 50 in FIG. 3), any time-base variations occurring in receiver 76 are automatically removed. Finally, the output of CCD 72 is combined with the correction signal generated in exclusive-OR network 80, at the input of amplifier 82, to produce at the output of amplifier 82 a delayed analog video signal with digital information removed.

I claim:

1. A system for forming a composite signal by combining digital information with scanlines of an analog video signal generated by a line scanning device and for recovering the digital information from the composite signal, which comprises:
   means for combining digital information with the analog video signal at predetermined locations along scanlines of the analog video signal to form said composite signal, the predetermined locations being substantially different as between a multiplicity of scanlines to substantially prevent visible deterioration of the image represented by the analog video scanlines; and
   means for recovering the digital information by examining the composite signal at said predetermined locations along the scanlines to extract the digital information combined with the analog video signal.

2. A system as in claim 1 including means for removing the digital information from the composite signal subsequent to recovering the digital information to regenerate the analog video signal.

3. A system as in claim 1 wherein the means for combining the digital information with the scanlines of the analog video signal comprises:
   means for counting the scanlines of the analog video signal and for providing an output representative of said counting;
   means for generating a first pulse sequence in synchronism with each analog video scanline, a selected parameter of said digital pulse sequence being a function of the level of a selected bit of the digital information, and the location of the pulse along the scanline being a selected function of the output of the scanline counting means; and
   means for combining each of said digital pulse sequences with its corresponding video scanline.

4. A system as in claim 3 wherein the means for generating the first digital pulse sequences comprises a pseudo-random maximum length sequence generator, said generator providing digital pulse sequences in which the location of the pulses is a selected function of the output of the scanline counting means.

5. A system as in claim 3 wherein the first pulse sequences are superimposed on the analog video scanlines; and wherein the amplitude of the superimposed digital pulse sequences is substantially less than the average amplitude of the analog signal on said video scanlines.

6. A system as in claim 1 wherein the means for combining digital information with the analog video signal at predetermined locations along scanlines of the analog video signal comprises:
   means for generating a series of first digital pulse sequences, each sequence representing a bit of said digital information; and
   means for combining each said first digital pulse sequence with a scanline of said analog video signal.

7. A system as in claim 6 wherein the means for recovering the digital information comprises:
   means for generating a series of second digital pulse sequences in synchronism with said series of first digital pulse sequences;
   means for examining the composite signal at locations determined by said second digital pulse sequences to recover the first digital pulse sequences and to extract the corresponding bits of digital information represented thereby.

8. A system as in claim 6 wherein the means for examining the composite signal to recover the digital information comprises:
  means for generating a second digital pulse sequence for each scanline in pulse-location synchronism with the first pulse sequence for that scanline, a selected parameter of said second pulse sequence corresponding to said parameter of the first sequence and being constant;
  means for examining said composite signal only at the locations established by said second pulse sequence; and
  means for recovering said digital information from said composite signal by comparing the selected parameter of said first pulse sequence at said locations with the constant selected parameter of said second pulse sequence at the same locations, to determine the value of the corresponding bit of digital information represented by said first digital pulse sequence.

9. A system as in claim 8 wherein the means for generating the second digital pulse sequences comprises a pseudo-random maximum length sequence generator, said generator providing digital pulse sequences in which the location of the pulses corresponds to the location of the pulses of said first sequences for corresponding scanlines.

10. A system as in claim 8 wherein each scanline of the analog video signal is preceded by a line synchronization signal, and including means for initiating said first and second digital pulse sequences in synchronism with said line synchronization signals.

11. A system as in claim 8 wherein the selected parameter of said first and second pulse sequences is the phase of said pulse sequences.

12. A system as in claim 11 wherein the means for recovering the digital information comprises:
  a phase coincidence detector comparing the phase of the first digital pulse sequence combined with the analog video scanlines with the phase of said second digital pulse sequences and generating an output which is a function of phase coincidence;
  means for integrating said phase coincidence detector output over at least a portion of each video scanline;
  means for deriving a reference level from the composite signal; and
  means for comparing said integrated phase coincidence detector output with the reference level to recover from each scanline the bit of digital information represented by the corresponding first sequence.

13. A system as in claim 12 wherein the phase coincidence detector comprises an analog multiplier.

14. A system as in claim 12 including:
  means for delaying each scanline of the composite signal by a time interval corresponding to one analog video scanline to the recovery of the bit of digital information from the composite signal;
  means responsive to the bit of digital information recovered from each scanline to regenerate the complement of the digital pulse sequence which was combined with the analog video signal of that scanline; and
  means for combining the regenerated digital pulse sequence with the delayed scanline of the composite signal to regenerate the original analog video signal.

15. A system as in claim 14 wherein the means for delaying each scanline of the composite signal comprises a coupled device serving as an analog delay line.

16. A method for forming a composite signal by combining digital information with scanlines of an analog video signal generated by a line scanning device and for recovering the digital information from the composite signal, which comprises:
  combining digital information with the analog video signal at predetermined locations along scanlines of the analog video signal to form said composite signal, the predetermined locations being substantially different as between a multiplicity of scanlines to substantially prevent deterioration of the image represented by the analog video scanlines; and
  recovering the digital information by examining the composite signal at said predetermined locations along the scanlines to extract the digital information from the composite signal.

17. A method as in claim 16 including the step of removing the digital information from the composite signal subsequent to recovering the digital information to regenerate the analog video signal.

18. A method as in claim 16 wherein the step of combininig the digital information with the scanlines of the analog video signal comprises:
  counting the scanlines of the analog video singal;
  generating a first digital pulse sequence in synchronism with each analog video scanline, a selected parameter of said digital pulse sequence being a function of the level of a selected bit of the digital information and the location of the pulse along the scanline being a selected function of the scanline count; and
  combining each of said digital pulse sequences with its corresponding video scanline.

19. A method as in claim 18 wherein the first digital pulse sequences are pseudo-random maximum length digital pulse sequences.

20. A method as in claim 18 wherein the combining step comprises superimposing the first pulse sequences on the analog video scanlines, and wherein the amplitude of the superimposed digital pulse sequences is substantially less than the average amplitude of the analog signal.

21. A method as in claim 16 wherein the combining step comprises:
  generating a series of first digital pulse sequences, each sequence representing a bit of said digital information; and
  combining each said first digital pulse sequence with a scanline of said analog video signal.

22. A method as in claim 21 wherein the recovering step comprises:
  generating a series of second digital pulse sequences in synchronism with said series of first digital pulse sequences;
  examining the composite signal at locations determined by said second digital pulse sequences to recover the first digital pulse sequences and to extract the corresponding bits of digital information represented thereby.

23. A method as in claim 21 wherein the recovering step comprises:
   generating a second digital pulse sequence for each scanline in pulse-location synchronism with the first pulse sequence, a selected parameter of said second pulse sequence corresponding to said parameter of the first sequences and being constant;
   examining said composite singal only at the locations establihed by said second pulse sequence; and
   recovering said digital information from said composite signal by comparing the selected parameter of said first pulse sequence at said locations with the constant selected parameter of said second pulse sequence at the same locations, to determine the value of the corresponding bit of digital information represented by said first digital pulse sequence.

24. A method as in claim 23 wherein the step of generating the second digital pulse-sequence comprises generating pseudo-random maximum length digital pulse sequences in which the location of the pulses corresponds to the location of the pulses of said first sequences.

25. A method as in claim 23 wherein each scanline of the analog video signal is preceded by a line sychronization signal, and wherein the signal initiates said first and second digital pulse sequences in synchronism with the start of each analog video scanline.

26. A method as in claim 23 wherein the selected parameter of said first and second pulse sequences is the phase of said pulse sequences.

27. A method as in claim 26 wherein the recovering step comprises:
   comparing the phase of the first digital pulse sequence combined with the video scanlines with the phase of said second digital pulse sequences and generating an output which is a function of phase coincidence;
   integrating said phase coincidence detector output over at least a portion of each video scanline; and
   comparing said integrated phase coincidence detector output with the reference level to recover from each scanline the bit of digital information represented by the corresponding first sequence.

28. A method as in claim 27 including the steps of:
   delaying each scanline of the composite signal by a time interval corresponding to one scanline subsequent to the recovery of the digital information from said composite signal;
   using the bit of digital information recovered from each scanline to regenerate the compliment of the digital pulse sequence which was combined with the analog video signal on each scanline; and
   combining the regenerated digital pulse sequence with the delayed composite signal to regenerate the analog video signal.

29. A method as in claim 28 wherein the step of delaying each scanline of the composite signal comprises passing each scanline through a charge coupled device acting as an analog delay line.

30. A method of combining digital information with an analog video signal generated by a line scanning device providing video frames and subsequently recovering said digital information, which comprises:
   generating a line count proportional to the number of line scans which have occurred within a video frame;
   generating a first pseudo-random digital pulse sequence and its complementary sequence synchronously with each line scan, the pulse distribution of said first pseudo-random digital pulse sequence and its complement being a function of said line count;
   selecting, for each scanline, either said first pseudo-random digital pulse sequence or said first complementary pulse sequence, depending upon the level of a selected bit of said digital information;
   superimposing each said selected first pulse sequence upon each corresponding line of said analog video signal to provide a composite line;
   for each first sequence generating a corresponding second pseudo-random digital sequence synchronized with said first sequence;
   coherently detecting each said composite line of said analog video signal by multiplying the composite line with the corresponding second pseudo-random digital sequence to provide a product signal;
   integrating the product singal of each coherent detection over at least a portion of the duration of the corresponding line;
   generating a signal representing the average level of each line of the composite signal;
   comparing each integrated signal with the signal representing the average level of said composite signal for each said corresponding line;
   determining whether said pseudo-random digital pulse sequence or said complementary sequence was superimposed upon each line of said video signal based upon whether each said integrated signal differs substantially from each average level; and
   generating a signal to indicate whether said pseudo-random digital pulse sequence or its complement was superimposed on each line of said analog video signal.

31. An apparatus for combining digital information with an analog video signal generated by a line scanning device providing video frames and subsequently recovering said digital information, which comprises:
   means for generating a line count proportional to the number of line scans which have occurred within a video frame;
   means for generating a first pseudo-random digital pulse sequence and its complementary sequence sychronously with each line scan, the pulse distribution of said first pseudo-random digital pulse sequence and its complement being a function of said line count;
   means for selecting, for each scanline, either said first pseudo-random digital pulse sequence or said first complementary pulse sequence, depending upon the level of a selected bit of said digital information;
   means for superimposing each said selected first pulse sequence upon each corresponding line of said analog video signal to provide a composite line;
   means for generating, for each first sequence, a second pseudo-random digital sequence synchronized with said first sequence;
   means for coherently detecting each said composite line of said analog video signal by multiplying the composite line with the corresponding second pseudo-random digital sequence to provide a product signal;

means for integrating the product signal of each coherent detection over at least a portion of the duration of the corresponding line;

means for generating a signal representing the average level of each line of the composite signal;

means for comparing each integrated signal to the signal representing the average level of said composite signal for each corresponding line;

means for determining whether said pseudo-random digital pulse sequence or said complementary sequence was superimposed upon each line of said video signal based upon whether each said integrated signal differs substantially from each average level for the corresponding line; and means for generating a signal to indicate whether said pseudo-random digital pulse sequence or its complement was superimposed on each line of said analog video signal.

32. A system for forming a composite signal by combining digital information with scanlines of an analog video signal generated by a line scanning device, which comprises means for combining digital information at predetermined locations along scanlines of the analog video signal to form said composite signal, the predetermined locations being substantially different as between a multiplicity of scanlines to substantially prevent visible deterioration of the image represented by the analog video scanlines.

33. A system as in claim 32 wherein the combining means comprises:
means for generating a series of digital pulse sequences, each sequence representing a bit of said digital information; and
means for combining each said digital pulse sequence with a different scanline of said analog video signal.

34. A system as in claim 32 wherein the means for combining the digital information with the scanlines of the analog video signal comprises:
means for counting the scanlines of the analog video signal and for providing an output indicative of the count;
means for generating a digital pulse sequence in synchronism with each analog video scanline, a selected parameter of said digital pulse sequence being a function of the level of a selected bit of the digital information and the location of the pulses along the scanline being a selected function of the output of the scanline counting means; and
means for combining each of said digital pulse sequences with its corresponding video scanline.

35. A system as in claim 34 wherein the selected parameter of said digital pulse sequences is the phase of said digital pulse sequences.

36. A system as in claim 34 wherein the means for generating the digital pulse sequences comprises a psuedo-random maximum length sequence generator.

37. A system as in claim 34 wherein the digital pulse sequences are superimposed on the analog video scanlines, and wherein the amplitude of the superimposed digital pulse sequences is substantially less than the average amplitude of the analog video signal.

38. A method for forming a composite signal by combining digital information with scanlines of an analog video signal generated by a line scanning device, which comprises combining digital information at predetermined locations along scanlines of the analog video signal to form said composite signal, the predetermined locations being subtantially different as between a multiplicity of scanlines to substantially prevent visible deterioration of the image represented by the analog video scanlines.

39. A method for forming composite signal as in claim 38 wherein the combining step comprises:
generating a series of digital pulse sequences, each sequence representing a bit of said digital information; and
combining each said digital pulse sequence with a scanline of said analog video signal.

40. A method as in claim 38 wherein the step of combining the digital information with the scanlines of the analog video signal comprises:
counting the scanlines of the analog video signal;
generating a digital pulse sequence in synchronism with each analog video scanline, a selected parameter of said digital pulse sequence being a function of the level of a selected bit of the digital information, and the location of the pulses along the scanline being a selected function of the scanline count; and
combining each of said digital pulse sequences with its corresponding video scanline.

41. A method as in claim 40 wherein the selected parameter of said digital pulse sequences is the phase of said digital pulse sequences.

42. A method as in claim 40 wherein the step of generating the digital pulse sequences comprises generating psuedo-random maximum length seqences.

43. A method as in claim 40 wherein the digital pulse sequences are superimposed on the analog video scanlines, and wherein the amplitude of the superimposed digital pulse sequences is substantially less than the average amplitude of the analog video signal.

44. An apparatus for recovering digital information from a composite signal containing video scanlines and digital information combined with scanline portions at predetermined locations along each of a multiplicity of scanlines, said predetermined locations being substantially different as between a multiplicity of scanlines to substantially prevent visible deterioration of the image represented by the analog video scanlines, which comprises means for examining the composite signal at said predetermined locations along the scanlines to extract the digital information, and means for providing the extracted digital information.

45. A method for recovering digital information from a composite signal containing digital information at predetermined locations along scanlines of an analog video signal generated by a line scanning device, said predetermined locations being substantially different as between a multiplicity of scanlines to substantially prevent visible deterioration of the image represented by the analog video scanlines, which comprises examining the composite signal at said predetermined locations along the scanlines to extract the digital information, and providing an indication of the extracted digital information.

46. A system as in claim 1 wherein the scanlines are organized in video frames and wherein the combining means comprise means for combining the digital information with the video signal at predetermined locations which are different for each of the scanlines of at least a substantial portion of the scanlines of a video frame.

47. A method as in claim 16 wherein the scanlines are organized in video frames and wherein the combining step comprises combining the digital information with the video signal at predetermined locations which are different for each of the scanlines of at least substantial portion of the scanlines of a video frame.

48. A method as in claim 30 wherein the step of generating said sequences comprises generating a different sequence for each of the scanlines of a video frame.

49. A method as in claim 30 wherein the step of generating said sequences comprises generating a different sequence for each of at least a substantial portion of the scanlines of a video frame.

50. An apparatus as in claim 31 wherein the means for generating said sequences comprise means for generating a different sequence for each of the scanlines of a video frame.

51. An apparatus as in claim 31 wherein the means for generating said sequence comprise means for generating a different sequence for each of at least a substantial portion of the scanlines of a video frame.

* * * * *

UNITED STATES PATENT OFFICE
CERTIFICATE OF CORRECTION

Patent No. 3,984,624      Dated October 5, 1976

Inventor(s) William N. Waggener

It is certified that error appears in the above-identified patent and that said Letters Patent are hereby corrected as shown below:

Column 2, line 12, "signals" should read -- systems --.

Column 5, line 7, "in" should read -- to --.

Column 7, line 50, after "pseudo-random" insert -- pulse --.

Column 11, line 62, after "scanline" insert
-- subsequent --.

Signed and Sealed this

Tenth Day of May 1977

[SEAL]

Attest:

RUTH C. MASON
Attesting Officer

C. MARSHALL DANN
Commissioner of Patents and Trademarks